United States Patent [19]

Christensen

[11] 4,406,501
[45] Sep. 27, 1983

[54] RECOIL SYSTEM WITH GUIDED SLIDE ASSEMBLY FOR TRACK-TYPE VEHICLES

[75] Inventor: Jon C. Christensen, Chillicothe, Ill.

[73] Assignee: Caterpillar Tractor Co., Peoria, Ill.

[21] Appl. No.: 361,698

[22] Filed: Jan. 29, 1982

[51] Int. Cl.³ .................. B62D 55/10; B62D 55/16; B62D 55/30
[52] U.S. Cl. .................................... 305/10; 305/22; 305/28; 305/31
[58] Field of Search ............... 305/10, 22, 24, 27, 305/28, 31, 32

[56] References Cited

U.S. PATENT DOCUMENTS

| | | | |
|---|---|---|---|
| 1,566,490 | 12/1925 | Lindquist | 187/95 |
| 1,594,887 | 8/1926 | Leake | 305/32 |
| 1,674,817 | 6/1928 | Best | 305/32 |
| 2,888,300 | 5/1959 | Curtis et al. | 308/3 |
| 3,451,608 | 6/1969 | Deemie et al. | 228/2 |
| 3,465,829 | 9/1969 | Fisher et al. | 172/743 |
| 3,537,762 | 11/1970 | Lödige | 308/3 |
| 3,826,325 | 7/1974 | Purcell et al. | 180/9.54 |
| 3,841,715 | 10/1974 | Comer, Jr. et al. | 305/10 |
| 4,058,174 | 11/1977 | Atherton et al. | 172/781 |
| 4,059,314 | 11/1977 | Amstutz | 305/32 X |
| 4,101,177 | 7/1978 | Bianchi et al. | 305/31 |
| 4,105,078 | 8/1978 | Gilbert | 172/781 |

FOREIGN PATENT DOCUMENTS 2420367 11/1974 Fed. Rep. of Germany ........ 305/10
889490 1/1944 France .................................. 305/31

OTHER PUBLICATIONS

Exhibit A-Caterpillar D-10 Sales Brochure (cover and p. 17).
Exhibit B-Caterpillar D-10 Tractor-Track Roller Frame Group (Parts Book-p. 168).

Primary Examiner—David A. Scherbel
Attorney, Agent, or Firm—Phillips, Moore, Lempio & Finley

[57] ABSTRACT

A track-type vehicle (10) includes a track roller frame (13), a track idler (18) mounted forwardly on the track roller frame (13), and a recoil system (19) interconnected between the track roller frame (13) and the track idler (18). Conventional recoil systems, such as those employing one or more return springs therein, are sometimes subjected to adverse impact loads which could unduly subject undercarriage components to high stresses. This invention is directed to a slider assembly (29) slidably mounted for fore and aft movements on the track roller frame (13) and having the track idler (18) rotatably mounted thereon. Linear movement of the slider assembly (29) on the track roller frame (13) is guided by a pair of guides (30) laterally spaced on either side of the track idler (18).

14 Claims, 4 Drawing Figures

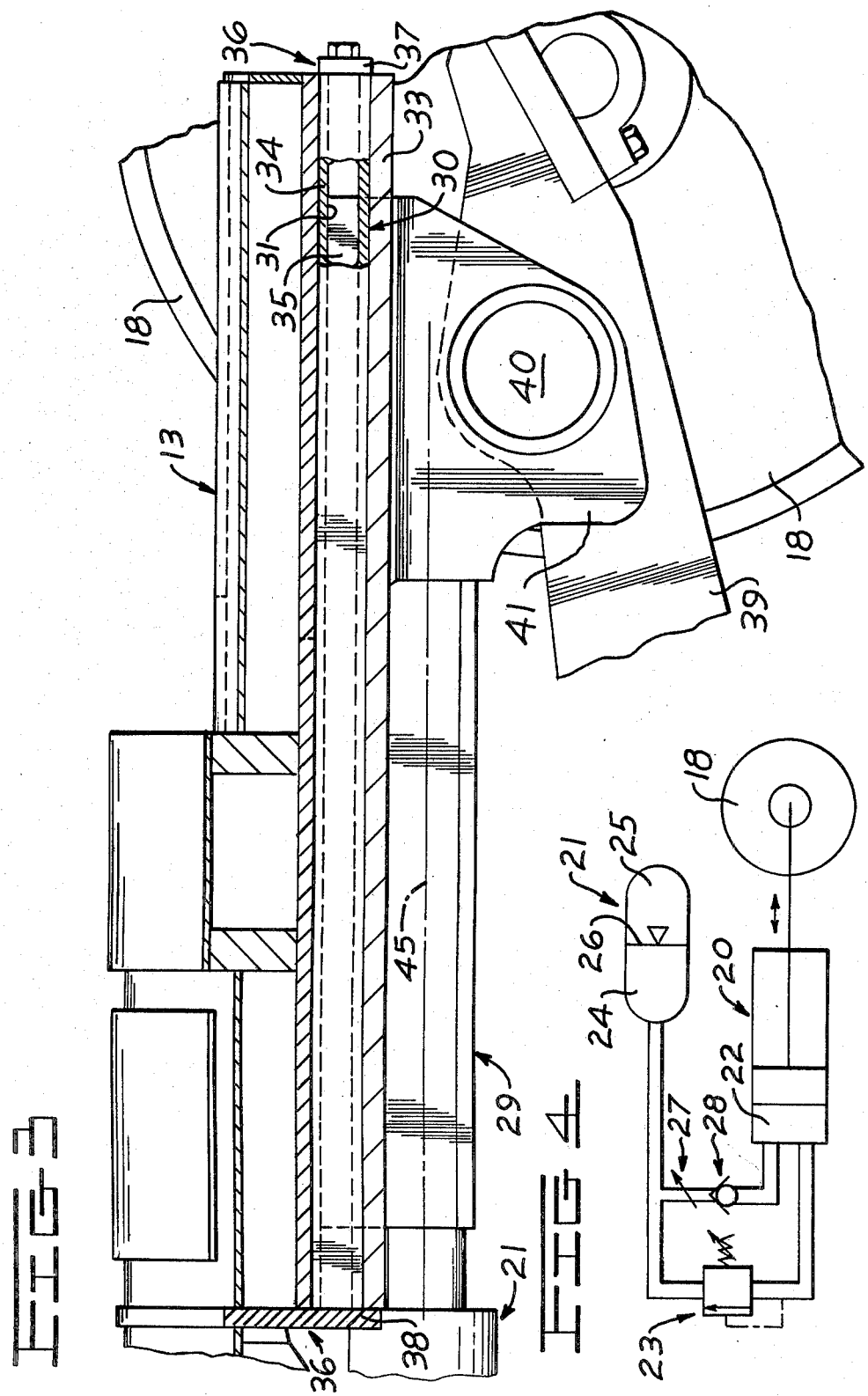

RECOIL SYSTEM WITH GUIDED SLIDE ASSEMBLY FOR TRACK-TYPE VEHICLES

Description

TECHNICAL FIELD

This invention relates generally to a recoil system for a track-type vehicle and more particularly to a slider assembly of the recoil system, slidably mounted on a track roller frame.

BACKGROUND ART

Track-type vehicles, such as crawler tractors, normally include a recoil system interconnecting the front track idler and track roller frame thereof. When a tractor is employed in operations wherein the undercarriage thereof is subjected to loads of high magnitude, such as a log skidding operation, the recoiling and return of a track idler to its initial, operational position must be effected in a closely controlled and efficient manner. In particular, it is desirable to reciprocate the track idler linearly without imposing any twisting or bending moments on the recoil system and undercarriage components associated therewith.

In the mechanical type recoil systems employing one or more return springs therein, the track idler is sometimes connected to the return spring by a yoke assembly and a slide bar reciprocally mounted in an annular bearing. Another type of mechanical recoil system includes a spring-biased tubular member having a track idler mounted forwardly therein. The tubular member is reciprocally mounted in a track roller frame.

Although slide bearings, per se, have been widely used in various applications wherein a pair of members necessarily reciprocate relative to each other, their use in recoil systems for track-type vehicles has been limited due to space, servicing, mounting problems and related difficulties. In the type of track-type vehicle or tractor under consideration, it is highly desirable to provide a compact recoil system that enables a workman to expeditiously assemble and disassemble the system for servicing purposes.

The present invention is directed to overcoming one or more of the problems as set forth above.

DISCLOSURE OF INVENTION

The present invention is generally directed to a track-type vehicle comprising a track roller frame, a track idler mounted forwardly on the track roller frame, a recoil system interconnected between the track roller frame and the track idler, and a slider assembly having a pair of laterally spaced slide means for slidably mounting the slider assembly for fore and aft movements on the track roller frame.

In one aspect of the present invention, the slider assembly includes a pair of brackets disposed on either side and rotatably mounting the track idler therebetween with the brackets being positioned below the slide means.

In another aspect of this invention, the slide means includes an elongated flange formed on an upper end of each of the brackets and slidably mounted in an elongated slot defined internally on the track roller frame.

In still another aspect of this invention, the slide means further includes an elongated wear insert, preferably channel-shaped, slidably mounting the flange therein.

The above-described slider assembly and wear inserts will provide the recoil system with a high degree of structural integrity and will ensure substantial linear fore and aft movement of the slider assembly on the track roller frame so that components of the recoil system and attendant components of the undercarriage will not be unduly stressed and subjected to adverse torsional and bending loads. The present recoil system is especially advantageous in that it permits the front idler supporting bellcrank to be mounted very near the line of action of the recoil system. This minimizes torsional loadings imposed upon the slider assembly portion of the recoil system. In addition, the improved recoil system is compact and facilitates assembly and disassembly thereof for servicing purposes.

BRIEF DESCRIPTION OF THE DRAWINGS

Other objects and advantages of this invention will become apparent from the following description and accompanying drawings wherein:

FIG. 3 is an enlarged side elevational view of the slider assembly with parts being broken-away for clarification purposes; and FIG. 4 schematically illustrates a fluid control circuit employed in the recoil system and connected to the track idler of the vehicle.

BEST MODE OF CARRYING OUT THE INVENTION

Figure 1:
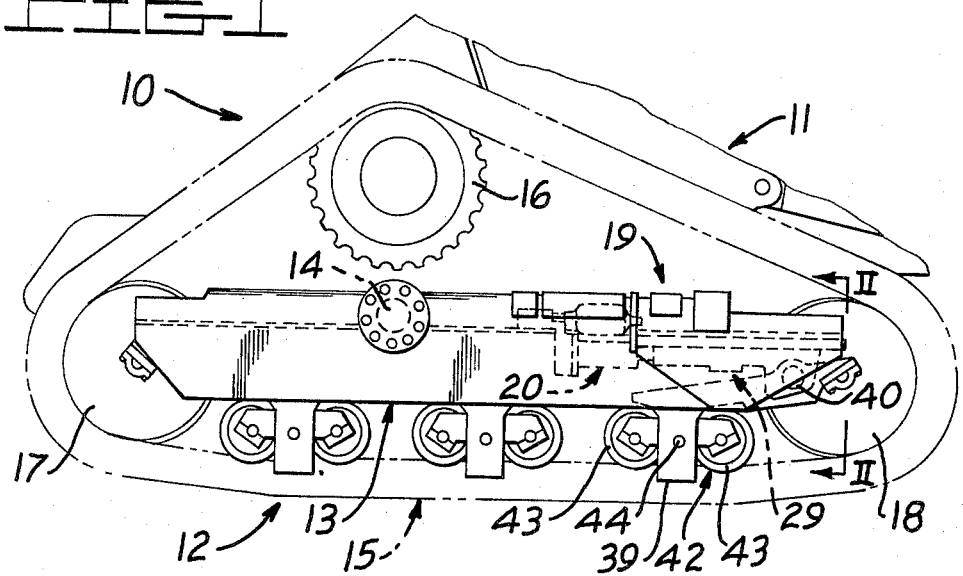
FIG. 1 is a partial side elevational view of a track-type vehicle employing a recoil system embodiment of the present invention therein.

FIG. 1 partially illustrates a track-type vehicle 10, such as a crawler tractor, including a chassis 11 and an undercarriage 12. A pair of laterally spaced track roller frames 13 (one shown) are pivotally mounted on opposite sides of a main frame of the chassis, each by stub shaft 14. An endless track assembly 15 is mounted on each track roller frame and is entrained about a drive sprocket 16, a rear track idler 17, and a front track idler 18.

As described more fully hereinafter, front track idler 18 is mounted forwardly on track roller frame 13 for pivotal movements thereon. A recoil system, generally shown at 19 is provided for permitting the front idler 18 to move aftwardly in response to a force of sufficient magnitude. Although the recoil system could be of the mechanical type, employing one or more return springs therein, the system preferably comprises the hydraulic type schematically illustrated in FIG. 4. In particular, recoil movements of front track idler 18 are controlled by a hydraulic fluid control circuit, including a piston and cylinder assembly 20 and an accumulator 21.

When the vehicle track tension becomes sufficiently great, as, for example, by foreign matter coming between an idler or sprocket and the track, the track idler will recoil, tending to compress and, hence, pressurize the hydraulic fluid contained in a chamber 22 of the piston and cylinder assembly 20. The increased fluid pressure functions to open a pilot operated one-way valve 23 to communicate pressurized fluid flow to a chamber 24 of the accumulator 21. a second chamber 25 of the accumulator 21 is gas-pressurized in a conventional manner and separated from chamber 24 by an elastomeric and flexible bladder 26. Recoil can also occur as a result of a sudden stop or from the front idler 18 squarely striking a massive object.

After the load is relieved or removed, the accumulator 21 will function to pressurize chamber 22 through a variably sized and adjustable conduit or orifice 27 and a second one-way or check valve 28. In this manner, extension of the piston and cylinder assembly 20 to return track idler 18 to its original, operational position will be closely controlled to prevent imposition of undue stresses on the undercarriage components.

Figure 2:
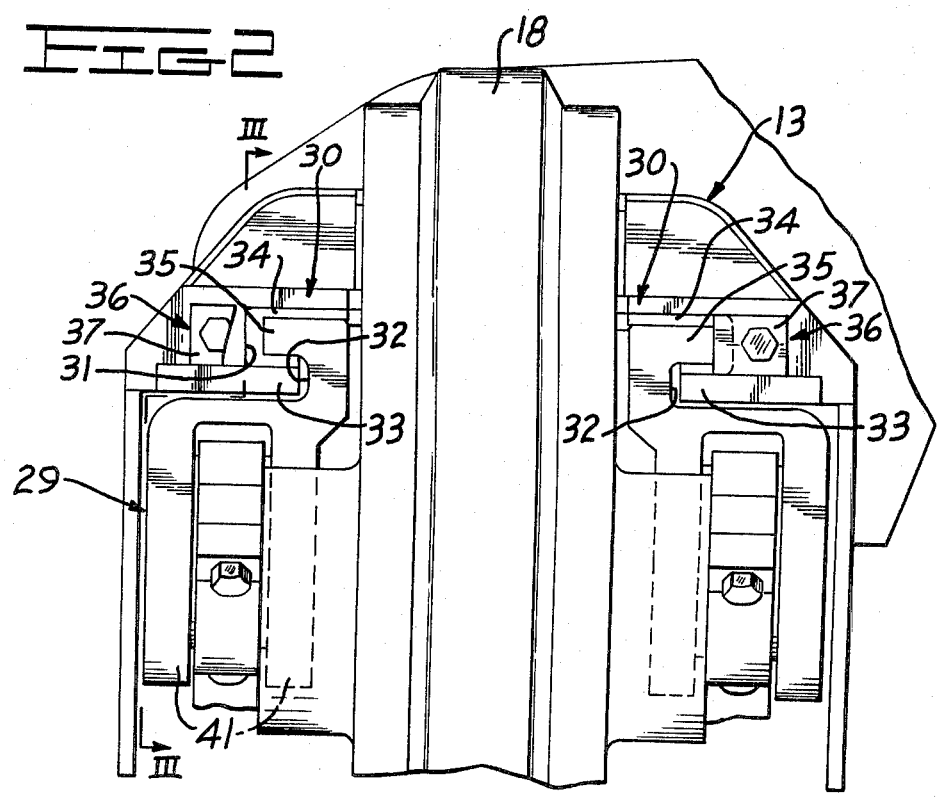
FIG. 2 is an enlarged end elevational view illustrating the mounting of a track idler and slider assembly of the recoil system on a track roller frame of the vehicle, with the view being taken in a direction of arrows II—II in FIG. 1.

Referring to FIGS. 1–3 recoil system 19 further includes a slider assembly 29, slidably mounted for fore and aft movements on the track roller frame 13. A pair of horizontally disposed slide means 30 are provided for translating loads imposed on the front track idler 18 to linear movement of the slide assembly 29 on the track roller frame 13. As more clearly shown in FIG. 2, the slide means 30 are laterally spaced on either side of idler 18 and are substantially identical in construction and arrangement.

Each slide means 30 comprises an elongated slot 31 defined internally on the track roller frame 13 with the pair of slots 31 being laterally positioned to face each other. A pair of laterally spaced recesses 32 are formed on slider assembly 29 and receive flanges or plates 33 of the track roller frame 13 therein. An elongated wear insert 34, preferably composed of a hardened steel alloy, is slidably and removably mounted within each slot 31 of the track roller frame 13.

A pair of laterally spaced and horizontally disposed flanges 35 are each slidably disposed with a respective insert 34 which defines bearing surfaces therein for slidably mounting the slider assembly 29 on the track roller frame 13. Each wear insert 34 preferably forms a one-piece channel construction generally having a J-shape, when viewed in cross section as shown in FIG. 2. Thus, slide means 30 will ensure that only linear movement is accorded to slider assembly 29 upon reciprocation thereof to counteract any tendency for the track idler 18 and slider assembly 29 to twist or bend during a recoil mode of operation of the vehicle.

As further shown in FIGS. 2 and 3, retaining means 36 are provided for holding each wear insert 34 in a fixed position between the track roller frame 13 and the slider assembly 29. In the embodiment illustrated, the retaining means 36 include plates 37, releasably attached to a forward end of the track roller frame 13 to at least partially overlap the ends of the wear inserts 34, and a plate 38 suitably secured on the track roller frame 13 to at least partially overlap the opposite ends of the wear inserts 34 (FIG. 3.) Thus, each wear insert 34 is trapped intermediate removable plate 37 and fixed plate 38. The wear inserts 34 are preferably sized to be substantially equal in length to the distance between the removable plate 37 and the fixed plate 38. Consequently, there is substantially no motion of the wear insert 34 relative to the slide means 30 in response to movement of the slider assembly 29.

As shown in FIGS. 1 and 3, a support bracket or bogie arm 39 is pivotally mounted by a large pivot pin 40 on a bifurcated bracket 41, formed as an integral part of slider assembly 29 and extending downwardly therefrom. The front track idler 18 is rotatably mounted on one end of bogie arm 39 whereas a bogie arrangement 42, carrying track-engaging rollers 43 thereon, (FIG. 1) is pivotally mounted on the opposite end of the bogie arm by a pin 44. With this arrangement loads imposed on track idler 18 will tend to pivot the idler and bogie arm 39 counterclockwise in FIG. 1 to pivot bogie arrangement 42 downwardly into engagement with track assembly 18 to aid in stabilizing the vehicle.

It is especially important to note that the present recoil system with guided slide assembly 29 permits the pivot pins 40 to be positioned a relatively very small distance beneath the line of action 45 of the recoil system. It will be appreciated that it is advantageous to have a relatively long slide assembly 29-flange 33 interface for the purpose of providing resistance to upward and downward motion of the slide assembly 29 relative to the roller frame 13. Consequently, placing the pivot pin 40 directly in front of (that is, in line with) the slide assembly-flange interface would result in an unacceptably long undercarriage. As a result, the pivot pin 40 is placed beneath the interface resulting in a torque being imposed on the recoil system in response to a force being applied from the front idler 18 to the pivot pin 40. The guided slide assembly 29 detailed in the present application is designed such that the distance from the center of the pivot pin 40 to the line of action 45 of recoil is relatively very small; consequently only relatively small torques are imposed upon the recoil system in response to forces acting on the front idler 18, as in recoil due to impact loading of the front idler 18. This torque minimization reduces loads imposed upon the wear inserts 34, reduces frictional resistance to recoil, avoids the need for unduly massive recoil system elements, and minimizes wear of all bearing surfaces.

INDUSTRIAL APPLICABILITY

Applicant's improved recoil system 19 finds particular application in endless track-type vehicles, such as crawler tractors, employed for log skidding operations or the like. During such an operation a tractor may reach a maximum speed of approximately 17.9 kilometers per hour with track roller frame oscillation being in the range of $-3°$. This type of high performance tractor is thus subjected to impact loads on the undercarriage thereof which must be efficiently absorbed during recoil of front track idler 18 with the recoil system functioning to return the idler to its original position to resume operation. In addition to protecting undercarriage components against damage or undue wear, the recoil system will function to relieve high track tension caused by the compaction of material or debris in the track assembly.

Assuming forward movement of the tractor in FIG. 1 and engagement of its track assembly 15 with an obstruction, such as a log or tree stump, track idler 18 will recoil to compress the hydraulic fluid in chamber 22 (FIG. 4) to open pilot operated one-way valve 23 and communicate such fluid to pressurized chamber 24 of accumulator 21. Pressurization of chamber 25 will, of course, be counteracted by the preset fluid pressure maintained in gas chamber 25 of the accumulator. As previously set forth, recoil can also occur in response to a sufficiently great increase in track tension, sudden stops and the like.

During this recoil mode of tractor operation, track idler 18 will pivot counterclockwise about the pivot axis of pin 40 in FIG. 1 to move slider assembly leftwardly in a closely controlled linear travel, as provided by slide means 30. After the impact load is relieved or removed, accumulator 21 will function to repressurize cylinder chamber 22 through variable orifice or sized conduit 27 and check valve 28. Slide means 30 (FIG. 2) will ensure that track idler 18 and bogie arrangement 42 are returned to their normal, operating positions against track assembly 15.

The slide means of this invention thus provide the recoil system and attendant undercarriage structures with a high degree of structural integrity and compactness (in a vertical direction). The compactness of the system functions to substantially reduce moments and loads imposed on the undercarriage in comparison to conventional undercarriages employing recoil systems therein. As described above, the recoil system, including the removable and slidable mounting of wear inserts 34 between the track roller frame and slider assembly 29 facilitates assembly and disassembly thereof for servicing purposes.

Other aspects, objects, and advantages of this invention can be obtained from a study of the drawings, the description, and the appended claims.

I claim:

1. In a track-type vehicle (10) having a track roller frame (13), a track idler (18) mounted forwardly on said track roller frame (13), and a recoil system (19) interconnected between said track roller frame (13) and said track idler (18), said recoil system (19) including a slider assembly (29) having a pair of elongated slide means (30) for slidably mounting said slider assembly (29) for fore and aft movements on said track roller frame (13), said slide means (30) being laterally spaced on either side of said track idler (18), the improvement comprising:

each of said slide means (30) including an elongated flange (35) and an elongated wear insert (34) mounted and providing bearing surfaces between said track roller frame (13) and said flange (35) and wherein said slider assembly (29) further includes a pair of brackets (41), disposed on either side and rotatably mounting said track idler (18) therebetween, each extending downward from a respective one of said flanges (35).

2. The vehicle (10) of claim 1 wherein said wear insert (34) is slidably and removably mounted between said track roller frame (13) and said flange (35).

3. The vehicle (10) of claim 2 further including retaining means (36) for holding said wear insert (34) in a fixed position on said track roller frame (13).

4. The vehicle (10) of claim 3 wherein said retaining means (36) includes plates (37,38) releasably attached to opposite ends of said track roller frame (13) to at least partially overlap the opposite ends of said wear insert (34).

5. The vehicle (10) of claim 1 further including an elongated slot (31) formed on said track roller frame (13) and wherein said wear insert (34) is channel-shaped and is mounted in said slot (31), said flange (35) being slidably mounted in said wear insert (34) and positioned to face laterally away from the other flange (35).

6. The vehicle (10) of claim 1 wherein said flanges (35) are formed on said slider assembly (29) to extend laterally away from each other and said slots (31) face inwardly towards each other.

7. A track-type vehicle (10) comprising
a chassis (11),
an undercarriage (12) including
a pair of track roller frames (13) mounted on opposite sides of said chassis (11),
an endless track assembly (15) mounted on each of said track roller frames (13),
a track idler (18) having said track assembly (15) entrained thereover, and
a recoil system (19) including
a slider assembly (29) slidably mounted for fore and aft movements on said track roller frame (13) and having a pair of downwardly extending brackets (41) rotatably mounting said track idler (18) therebetween, and
elongated and channel-shaped wear inserts (34) facing inwardly towards each other and slidably mounting said slider assembly (29) on said track roller frame (13) vertically above the location whereat said brackets (41) rotatably mount said track roller (18) thereon.

8. The vehicle (10) of claim 7 further including a pair of elongated flanges (35) laterally spaced on either side of said track idler (18) and slidably mounted in said wear inserts (34).

9. The vehicle (10) of claim 8 wherein said wear inserts (34) are slidably and removably mounted between said track roller frame (13) and said flanges (35).

10. The vehicle (10) of claim 9 further including retaining means (36) for holding said wear inserts (34) in a fixed position on said track roller frame (13).

11. The vehicle (10) of claim 10 wherein said retaining means (36) includes plates (37,38) releasably attached to opposite ends of said track roller frame (13) to at least partially overlap the opposite ends of each of said wear inserts (34).

12. The vehicle (10) of claim 7 wherein said recoil system (19) includes a fluid cylinder (20) and wherein said slider assembly (29) is connected to said fluid cylinder (20).

13. A track-type vehicle (10) comprising
a chassis (11),
an undercarriage (12) including
a pair of track roller frames (13) mounted on opposite sides of said chassis (11),
an endless track assembly (15) mounted on each of said track roller frames (13),
a track idler (18) having said track assembly (15) entrained thereover, and
a recoil system (19) including
a slider assembly (29) slidably mounted for fore and aft movements on said track roller frame (13) and having a pair of downwardly extending brackets (41) rotatably mounting said track idler (18) therebetween,
a pair of elongated slots (31) defined internally on said track roller frame to face inwardly towards each other, and
an elongated flange (35) formed on an upper end of each of said brackets (41) and slidably mounted in each of said slots (31).

14. The track-type vehicle (10) of claim 13 further including a channel-shaped wear insert (34) mounted in each of said slots (31) and having a said flange (35) slidably mounted therein.

* * * * *